(12) United States Patent
Griffin et al.

(10) Patent No.: US 8,830,667 B2
(45) Date of Patent: Sep. 9, 2014

(54) STORABLE KEYBOARD HAVING A PIVOTING COVER

(75) Inventors: Jason Tyler Griffin, Kitchener (CA); Martin Philip Riddiford, London (GB)

(73) Assignee: BlackBerry Limited, Waterloo (CA)

( * ) Notice: Subject to any disclaimer, the term of this patent is extended or adjusted under 35 U.S.C. 154(b) by 167 days.

(21) Appl. No.: 13/523,347

(22) Filed: Jun. 14, 2012

(65) Prior Publication Data

US 2013/0335890 A1    Dec. 19, 2013

(51) Int. Cl.
*H05K 5/00* (2006.01)
*H05K 7/00* (2006.01)
*G06F 1/16* (2006.01)
*G06F 1/20* (2006.01)

(52) U.S. Cl.
USPC .............. 361/679.2; 361/679.08; 361/679.11; 361/679.17

(58) Field of Classification Search
USPC ............. 361/679.08, 679.09, 679.11, 679.12, 361/679.13, 679.14, 679.15, 679.16, 361/679.17, 679.2
See application file for complete search history.

(56) References Cited

U.S. PATENT DOCUMENTS

| 7,539,526 B2 * | 5/2009 | Pirila et al. ................ 455/575.3 |
| 2007/0281747 A1 * | 12/2007 | Pletikosa et al. ............ 455/564 |
| 2010/0039759 A1 * | 2/2010 | Yang et al. ............... 361/679.08 |

FOREIGN PATENT DOCUMENTS

| EP | 2259558 A1 | 12/2010 |
| WO | 2008/074358 A1 | 6/2008 |

OTHER PUBLICATIONS

Extended European Search Report from related European Patent Application No. 12172075.9 dated Sep. 21, 2012; 8 pages.

* cited by examiner

*Primary Examiner* — Hoa C Nguyen
*Assistant Examiner* — Binh Tran
(74) *Attorney, Agent, or Firm* — Fitch, Even, Tabin & Flannery LLP

(57) ABSTRACT

A keyboard portion is configured to move (with respect to a housing) between a deployed position and a non-deployed position. A cover pivotally couples to the housing and is configured to at least partially cover the keyboard portion when the keyboard portion is in the non-deployed position and to reveal the keyboard portion when the keyboard portion is in the deployed position. By one approach the cover is configured to move the keyboard portion between the deployed position and the non-deployed position as the cover pivots with respect to the housing.

12 Claims, 5 Drawing Sheets

STORABLE KEYBOARD HAVING A PIVOTING COVER

FIELD OF TECHNOLOGY

The present disclosure relates to electronic devices and more particularly to keyboards.

BACKGROUND

Data and instruction-entry keyboards of various kinds are known in the art. Keyboards are typically comprised of a plurality of keycaps (such as depressible buttons, touch-sensitive surfaces, and so forth) that permit a user to selectively enter any of a variety of alphanumeric characters and/or to input corresponding instructions or selections. Two common examples in these regards are the so-called QWERTY keyboard and the so-called telephone keypad.

Small portable communication devices (such as so-called smartphones) often include a keyboard. To minimize the device's footprint those keyboards are sometimes disposed on a lower plane than the device's display. In these cases the display and the keyboard sometimes slide parallel to one another to bring the keyboard into a deployed position. In some other cases the keyboard comprises two or more multi-row segments that pivot in a planar fashion with respect to one another to permit the keyboard segments to be stored, again parallel to the device's display, as a stack of planar members within the device.

DETAILED DESCRIPTION

Figure 1:
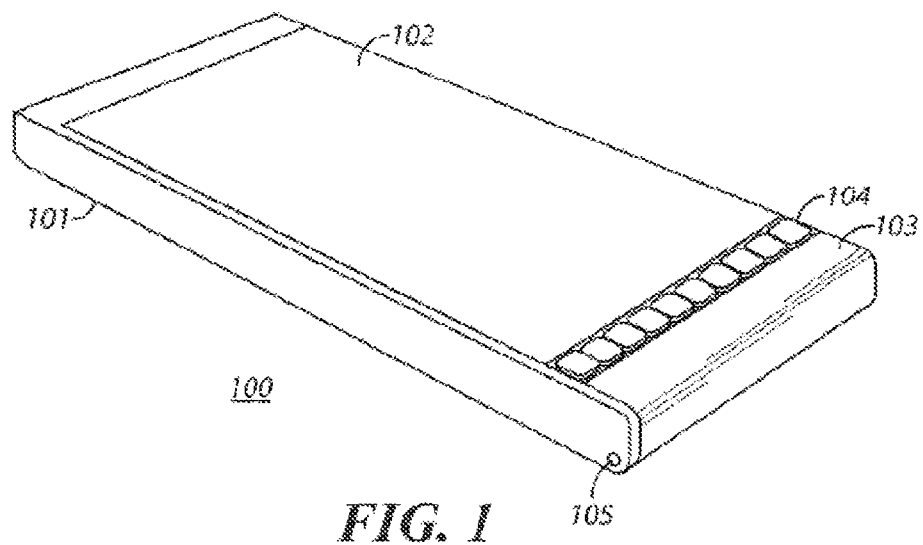
FIG. 1 is a perspective view in accordance with the disclosure.

The following describes an apparatus pertaining to a keyboard portion that is configured to move (with respect to a housing) between a deployed position and a non-deployed position. A cover pivotally couples to the housing and is configured to at least partially cover the keyboard portion when the keyboard portion is in the non-deployed position and to reveal the keyboard portion when the keyboard portion is in the deployed position. By one approach the cover is configured to move the keyboard portion between the deployed position and the non-deployed position as the cover pivots with respect to the housing.

By one approach the entire keyboard is hidden from view when stored in the non-deployed position. By another approach a part of the keyboard (such as a second portion of the keyboard from that referred to above) remains revealed and available even when the first portion of the keyboard is stored in the deployed position.

By one approach an end of the keyboard portion slides along a guide that comprises an interior part of the housing during at least part, but not all, of a transition from the non-deployed position to the deployed position. By one approach, in lieu of the foregoing or in combination therewith, a support surface that comprises a part of the cover contacts the keyboard portion to provide vertical support when that keyboard portion is in the deployed position.

So configured, a corresponding device such as a portable communication device can have both a small footprint when the keyboard portion is non-deployed while also offering an integral keyboard portion that can be readily and easily deployed when needed. These teachings will accommodate stowing all, or only a portion, of a given keyboard. These teachings are highly leverageable and are easily scaled to accommodate a wide variety of device types and application settings. These teachings are also highly flexible in practice and will accommodate, for example, stowing one, two, or more rows of keys as desired.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 depicts an illustrative portable electronics device comprising a portable communications device 100. For the sake of illustration this form factor will serve as the basis for describing various approaches that are consistent with the present disclosure. It will be understood, however, that no particular limitations are intended by way of the specifics of these particular examples and that the present teachings are readily applied with any of a variety of other devices and form factors.

In this illustrative example the portable communications device 100 comprises a housing 101 and a relatively large display 102. A cover 103 pivotally couples (via, for example, one or more pivot points 105) to one end of the housing 101. So configured, the cover 103 can be rotated about the pivot point 105 to deploy and reveal a first keyboard portion (not shown in FIG. 1).

In this particular example the portable communications device 100 also includes a second keyboard portion 104 (comprising, for example, a single row of keys) fixed in place between the display 102 and the cover 103. So configured, this second keyboard portion 104 remains deployed regardless of whether the first keyboard portion is in a deployed position or in a non-deployed position. By one approach, the first keyboard portion and the second keyboard portion 104 together comprise a single keyboard (such as a QWERTY keyboard). In such a case and if desired, the keycaps for the second keyboard portion 104 can include illuminatable alphanumeric characters that become illuminated (and hence visible) when the first keyboard portion is deployed and which are non-illuminated (and hence non-visible) when the first keyboard portion is stowed. Also if desired, indicia can be provided on the display 102 to indicate the corresponding functionality for the keys that comprise the second keyboard portion 104 (such as hot-key functionality, short-cut functionality, and so forth) when the first keyboard portion is stowed.

Figure 2:
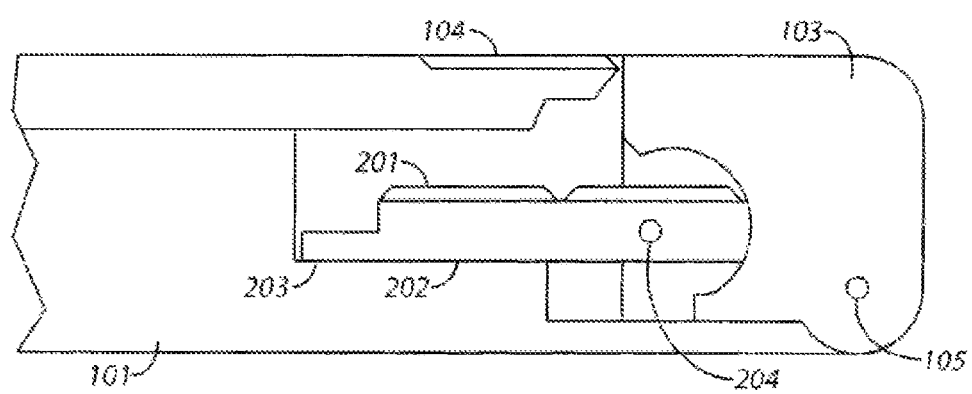
FIG. 2 is a side-elevational partially-transparent detail view in accordance with the disclosure.

FIG. 2 depicts the first keyboard portion 201 stowed within the housing 101 and the cover 103 in a fully non-deployed position. The keys and rows of keys of the first keyboard portion 201 are disposed on a substantially planar component 202 that pivotally couples at a pivot 204 to the cover 103 proximal a first end of the first keyboard portion 201. A second end 203 of the first keyboard portion 201 rests atop a guide shown in more detail below.

Figure 3:
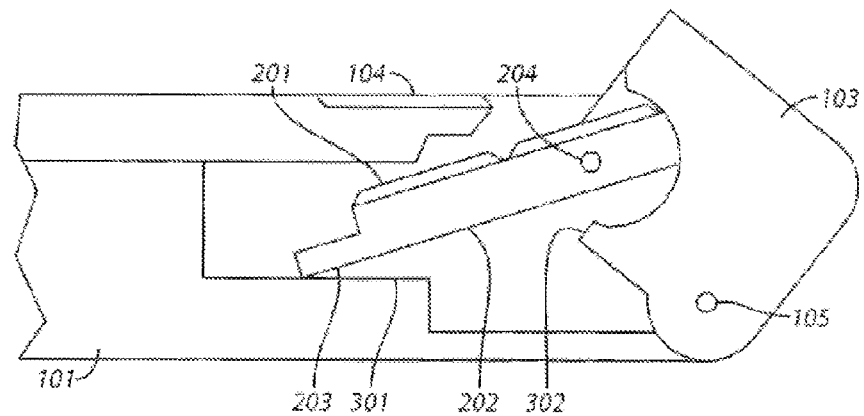
FIG. 3 is a side-elevational partially-transparent detail view in accordance with the disclosure.

Referring to FIG. 3, when the cover 103 beings to pivot forward about its pivot point 105 the first keyboard portion 201 will rotate about its pivot 204 and will move forwardly with respect to the housing 101 as well. In this illustrative example the second end 203 of the first keyboard portion 201 continues to rest (and slide) on a guide 301 as comprises a part of the housing 101 during at least part, but not all, of the transition from the non-deployed position to a fully-deployed position. In this case the guide 301 is substantially planar and parallel to the longitudinal plane of the housing 101. FIG. 3's view also illustrates that a support surface 302 as comprises a part of the cover 103 moves closer to the underside of the first keyboard portion 201 as the cover 103 pivots.

Figure 4:
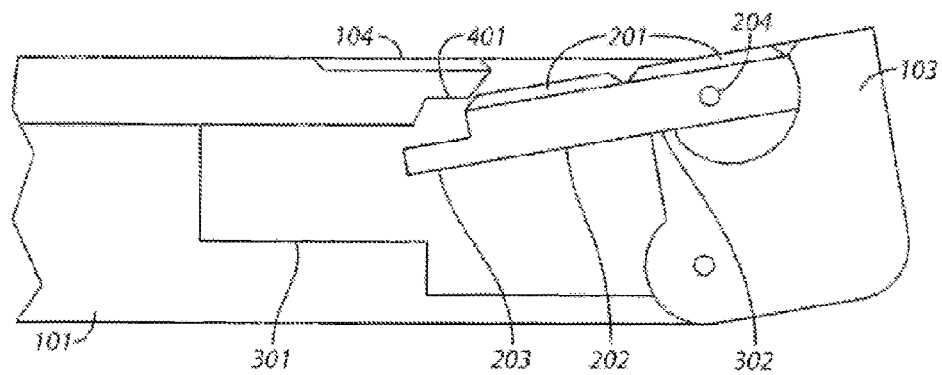
FIG. 4 is a side-elevational partially-transparent detail view in accordance with the disclosure.

Referring to FIG. 4, as the cover 103 continues to rotate the second end 203 eventually lifts away from the guide 301 as the first keyboard portion 201 rotates about its pivot 204 with the cover 103. This view also illustrates that the aforementioned support surface 302 as comprises a part of the cover 103 contacts the underside of the first keyboard portion 201 and now helps to continue moving the first keyboard portion 201 towards the fully-deployed position. This view also illustrates that the second end 203 approaches a stop 401 as also comprises a part of the housing 101. In this illustrative example, the stop 401 underlies a portion of the second keyboard portion 104.

Figure 5:
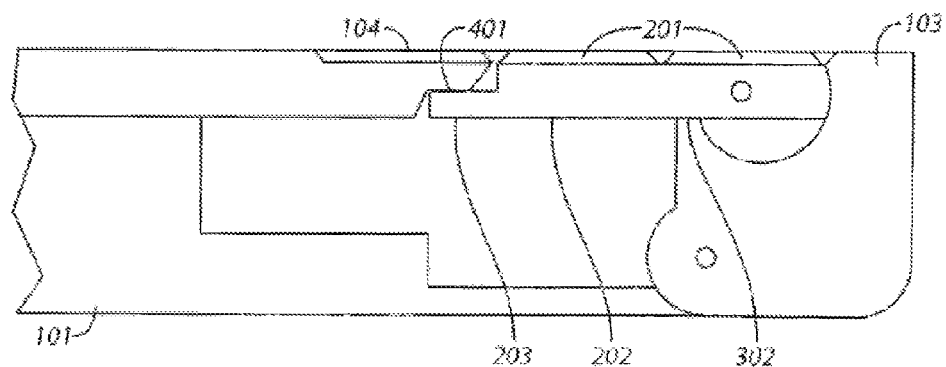
FIG. 5 is a side-elevational partially-transparent detail view in accordance with the disclosure.
Figure 6:
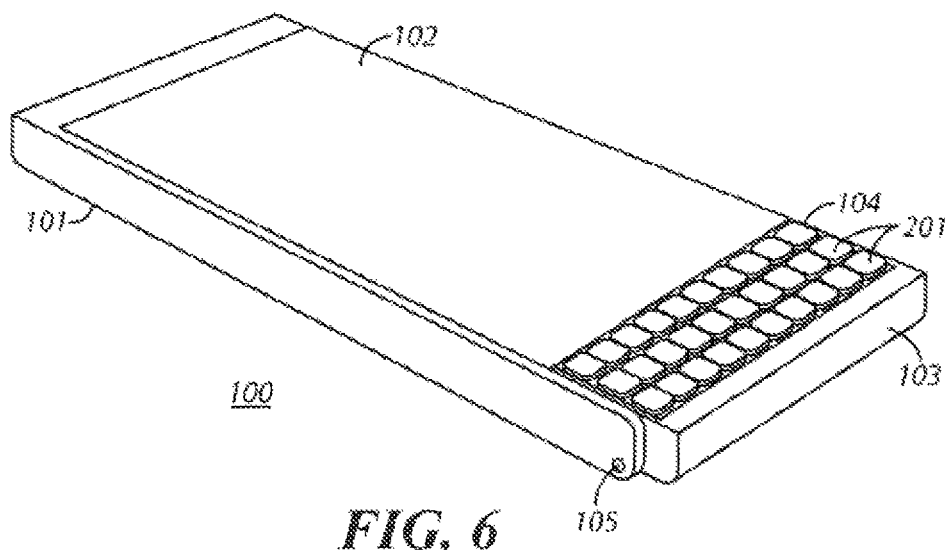
FIG. 6 is a perspective view in accordance with the disclosure.
Figure 7:
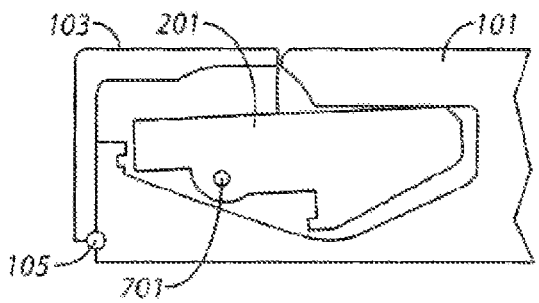
FIG. 7 is a side-elevational partially-transparent detail view in accordance with the disclosure.
Figure 8:
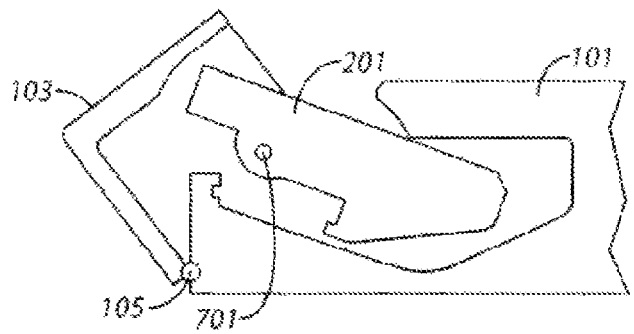
FIG. 8 is a side-elevational partially-transparent detail view in accordance with the disclosure.

When the cover 103 reaches a final position as shown in FIG. 5 the first keyboard portion 201 reaches a fully-deployed position. At this point the second end 203 now contacts the aforementioned stop 401 as comprises a part of the housing 101. So configured, the first and second keyboard portions 201 and 104 have exposed key surfaces that are substantially coplanar to one another. FIG. 5 also illustrates that the cover's support surface 302 provides vertical support to the first keyboard portion 201. This vertical support serves, in part, to provide firm support in opposition to when the user presses down on the first keyboard portion 201 during use. FIG. 6 provides another view of the first keyboard portion 201 in this fully-deployed position.

So configured, the ordinary footprint of the portable communications device 100 remains relatively small when the first keyboard portion 201 is stowed in the non-deployed position. When the user desires to have access to a complete physical keyboard, however, the user can simply pivot the cover 103 forward as described to quickly, easily, and reliably deploy and expose that keyboard. The first keyboard portion 201 is easily and readily returned to the non-deployed position by simply reversing the deployment process described above.

There are a variety of ways by which this first keyboard portion 201 can communicatively couple with a corresponding control circuit. This can include coupling and decoupling electrically-conductive elements as the first keyboard portion 201 moves between deployed and non-deployed positions, using one or more multi-conductor ribbon cables and/or flexible, optical pathways (such as one or more fiber optic fibers), and so forth. As the present teachings are not particularly sensitive to any particular choices in these regards, further elaboration will not be provided here.

Figure 9:
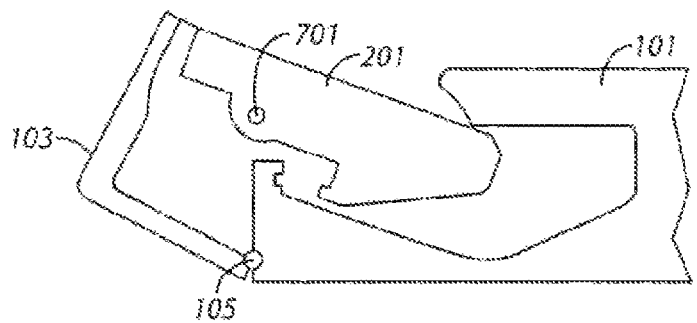
FIG. 9 is a side-elevational partially-transparent detail view in accordance with the disclosure.
Figure 10:
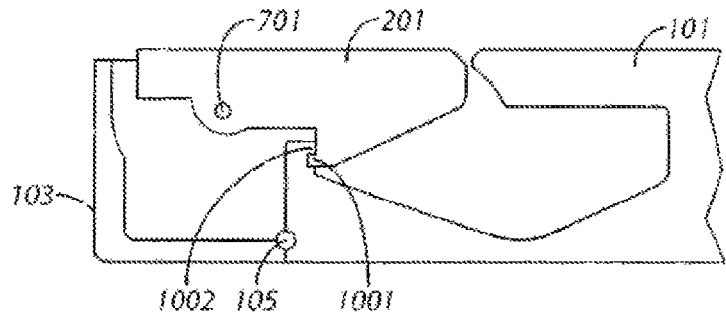
FIG. 10 is a side-elevational partially-transparent detail view in accordance with the disclosure.

FIGS. 7 through 10 provide another illustrative example in these regards. These figures again depict a pivot point 701 between the first keyboard portion 201 and the cover 103. These figures also depict a pair of hooks 1001 and 1002 on the first keyboard portion 201 and the housing 101, respectively, that engage as shown in FIG. 10 when the first keyboard portion 201 reaches a fully-deployed position.

More specifically, as the cover 103 opens by pivoting about the aforementioned pivot point 105, the first keyboard portion 201 pivots about its pivot point 701 in a clockwise direction (in the illustrated orientation) while also translating forwardly and upwardly. As the cover 103 continues to open, the first keyboard portion 201 continues its travel until the first keyboard portion 201 contacts the main housing 101 and begins to pivot in an opposing direction (i.e., counter clockwise in this illustrated orientation as shown in FIG. 9) about the pivot 701 until such time as the first keyboard portion is substantially planar to the housing 101 and the hooks 1001, 1002 fully engage each other.

Using the approach shown in FIGS. 7 through 10 the first keyboard portion 201 may comprise, if desired, the complete keyboard and may have, for example, one row of keys, two rows of keys, three rows of keys, and so forth as desired. Or, if desired, a permanently exposed keyboard portion can again be included as described above to operate in conjunction with the first keyboard portion 201.

Figure 11:
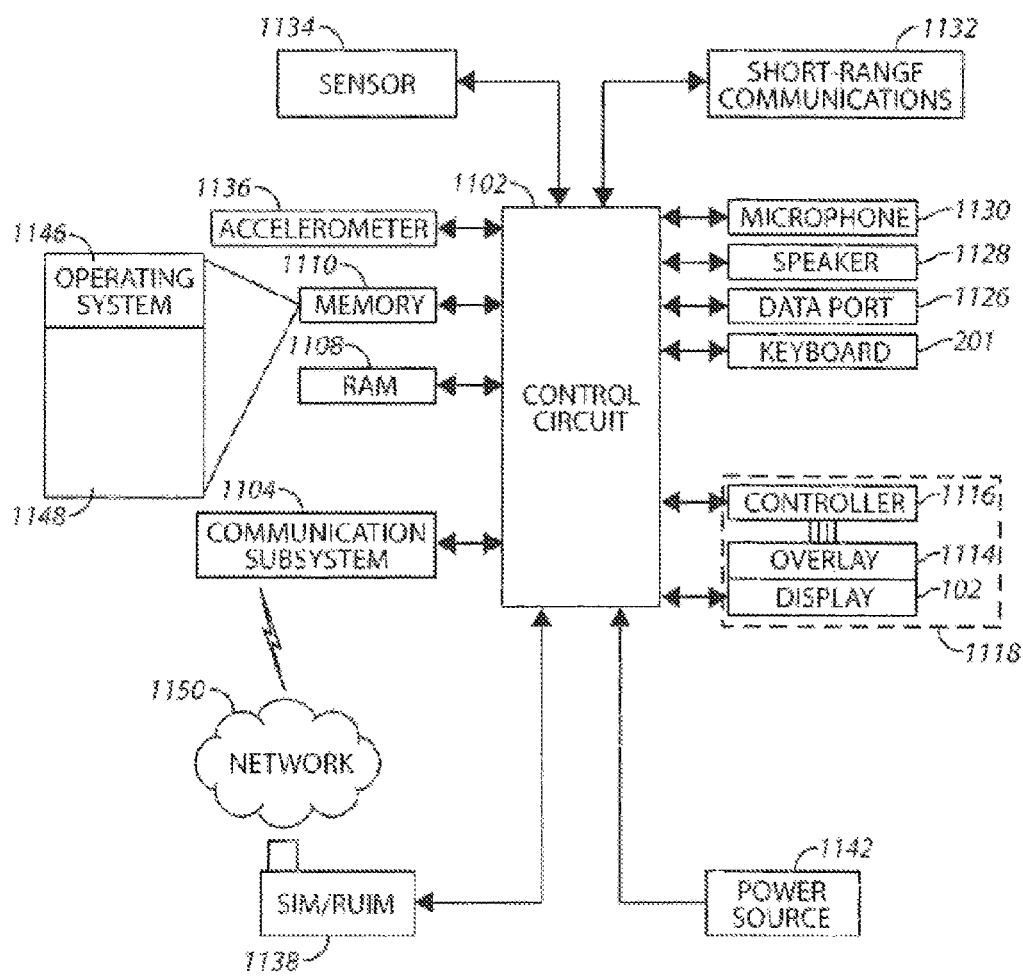
FIG. 11 is a block diagram in accordance with the disclosure.

These teachings are suitable for use with a wide variety of apparatuses. This can include, for example, a portable electronic device such as a portable communications device of choice. Referring to FIG. 11, an exemplary portable electronic device includes a control circuit 1102 that controls the overall operation of the portable electronic device. Communication functions, including data and voice communications, are performed through a communication subsystem 1104. The communication subsystem receives messages from and sends messages to a wireless network 1150. The wireless network 1150 may be any type of wireless network, including, but not limited to, data wireless networks, voice wireless networks, and networks that support both voice and data communications. A power source 1142, such as one or more rechargeable batteries or a port to an external power supply, powers the electronic device.

The control circuit 1102 interacts with other elements, such as a Random Access Memory (RAM) 1108, a memory 1110, the aforementioned display 102 along with a touch-sensitive overlay 1114 operably coupled to an electronic controller 1116 that together comprise an optional touch-sensitive display 1118, the aforementioned keypad 200, a data port 1126, a speaker 1128, a microphone 1130, a short-range communication subsystem 1132, and other device subsystems 1134 of choice (such as, for example, one or more sensors that detect when the first keyboard portion 201 are stored and/or deployed).

In this example, the control circuit 1102 also interacts with an accelerometer 1136 that may be utilized to detect direction of gravitational forces or gravity-induced reaction forces. To identify a subscriber for network access, the portable electronic device may utilize a Subscriber Identity Module or a Removable User Identity Module (SIM/RUIM) card 1138 for communication with a network, such as the wireless network 1150. Alternatively, user identification information may be programmed into the memory 1110.

The portable electronic device includes an operating system 1146 and software programs, applications, or components 1148 that are executed by the control circuit 1102 and are typically stored in a persistent, updatable store such as the memory 1110. Additional applications or programs may be loaded onto the portable electronic device through the wireless network 1150, the data port 1126, the short-range communications subsystem 1132, or any other suitable subsystem 1134. The memory 1110 may comprise a non-transitory storage media that stores executable code, when executed, causes one or more functions or actions of choice to be undertaken.

By one approach, the control circuit 1102 can be configured to automatically respond to the deployed and non-deployed state of the keyboard 200 (via, for example) the aforementioned sensor) in any of a variety of ways. As one simple example in these regards, when the first keyboard portion 201 is fully deployed the control circuit 1102 can present, via the display 102, a user interface that presumes data entry via a physical keyboard. When, however, the first keyboard portion 201 is stowed in the non-deployed position as described above, the control circuit 1102 can be configured to automatically present instead a user interface that presumes data entry via the touch-based overlay 1114.

The present disclosure may be embodied in other specific forms without departing from its essential characteristics. As one illustrative example in these regards, any of the keyboards described herein can comprise both mechanical keyboards (that rely upon movement of an individual key (or key component) to detect selection of that particular key) as well as touch-sensitive keyboards (where, for example, the keycaps use a capacitively-sensitive approach to detecting a user's mere touch) that can permit such a keyboard to respond as well to, for example, gestures, swipes, or the like that span multiple keycaps. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. An apparatus comprising:
   a housing;
   a first keyboard portion that is configured to move between a deployed position and a non-deployed position with respect to the housing, the first keyboard portion having a first end and a second end;
   a cover pivotally coupled to the housing and to the first end of the first keyboard portion and configured to at least partially cover the first keyboard portion when the first keyboard portion is in the non-deployed position and to reveal the first keyboard portion when the first keyboard portion is in the deployed position, the cover being configured to move the first keyboard portion between the deployed position and the non-deployed position as the cover pivots with respect to the housing;
   wherein the second end of the first keyboard portion rests on a guide within the housing when the first keyboard portion is in the non-deployed position.

2. The apparatus of claim 1 further comprising:
   a second keyboard portion, wherein the first keyboard portion and the second keyboard portion together comprise a single keyboard and wherein the second keyboard portion is disposed such that the second keyboard portion is deployed regardless of whether the first keyboard portion is in the deployed position or the non-deployed position.

3. The apparatus of claim 2 wherein the single keyboard comprises a QWERTY keyboard.

4. The apparatus of claim 1 wherein the first keyboard portion comprises a substantially planar component.

5. The apparatus of claim 1 wherein the second end of the first keyboard portion slides along the guide during at least part, but not all, of a transition from the non-deployed position to the deployed position.

6. The apparatus of claim 1 wherein the cover includes a support surface that contacts the first keyboard portion to provide support when the first keyboard portion is in the deployed position.

7. The apparatus of claim 6 wherein the support surface contacts the first keyboard portion during at least part, but not all, of a transition from the non-deployed position to the deployed position.

8. The apparatus of claim 1 wherein the cover pivotally attaches to the housing at one end of the housing.

9. A portable electronic apparatus comprising:
   a housing;
   a display supported by the housing;
   a first keyboard portion that is configured to move between a deployed position and a non-deployed position with respect to the housing, the first keyboard portion having a first end and a second end;
   a cover pivotally coupled to the housing and to the first end of the first keyboard portion and configured to at least partially cover the first keyboard portion when the first keyboard portion is in the non-deployed position and to reveal the first keyboard portion when the first keyboard portion is in the deployed position, the cover being configured to move the first keyboard portion between the deployed position and the non-deployed position as the cover pivots with respect to the housing, wherein the second end of the first keyboard portion rests on a guide within the housing when the first keyboard portion is in the non-deployed position; and
   a second keyboard portion wherein the first keyboard portion and the second keyboard portion together comprise a single keyboard and wherein the second keyboard portion is disposed such that the second keyboard portion is deployed regardless of whether the first keyboard portion is in the deployed position or the non-deployed position.

10. The portable electronic apparatus of claim 9 wherein the second keyboard portion comprises a single row of keys.

11. The portable electronic apparatus of claim 10 wherein the first keyboard portion comprises a plurality of rows of keys.

12. The portable electronic apparatus of claim 9 wherein the first keyboard portion, when the first keyboard portion is in the deployed position, and the second keyboard portion are substantially coplanar with the display.

\* \* \* \* \*